Feb. 23, 1965

H. ROTH ET AL 3,171,026

TELLURIUM DOSIMETER

Filed March 8, 1961

Inventors
Harold Roth
Werner B. Teutsch
Victor A. J. van Lint

United States Patent Office
3,171,026
Patented Feb. 23, 1965

3,171,026
TELLURIUM DOSIMETER
Harold Roth, Watertown, Mass., and Werner B. Teutsch and Victor A. J. van Lint, San Diego, Calif., assignors to General Dynamics Corporation, New York, N.Y., a corporation of Delaware
Filed Mar. 8, 1961, Ser. No. 94,263
4 Claims. (Cl. 250—83.3)

The present invention relates to a radiation monitor and more particularly to a device for monitoring the total amount of radiation which has impinged thereon.

In certain applications it may be desirable to measure the total amount of radiation (dose) delivered to a specified area or volume or to a whole body. For example, it may be desirable to study the radiation in the vicinity of a reactor or study the radiation afforded engineering materials by an accelerator.

It is highly advantageous that a device for monitoring total radiation be not permanently damaged by radiation so that the device may be reusable without recalibration. Yet the device should retain its integrated reading for a substantial length of time or until the reading is erased. Also it is advantageous that such a device be able to monitor a wide range of radiation. Furthermore, it is desirable that a radiation monitor be quickly and simply read and calibrated.

An object of the present invention is the provision of a radiation monitor which generally includes one or more of the above features. Another object of the invention is the provision of a novel device which monitors the integrated radiation flux incident thereon. A further object is the provision of a device for measuring total radiation which is durable in operation and relatively simple to employ.

Other objects and advantages of the present invention will become apparent by reference to the following description and accompanying drawings.

Figure 1:
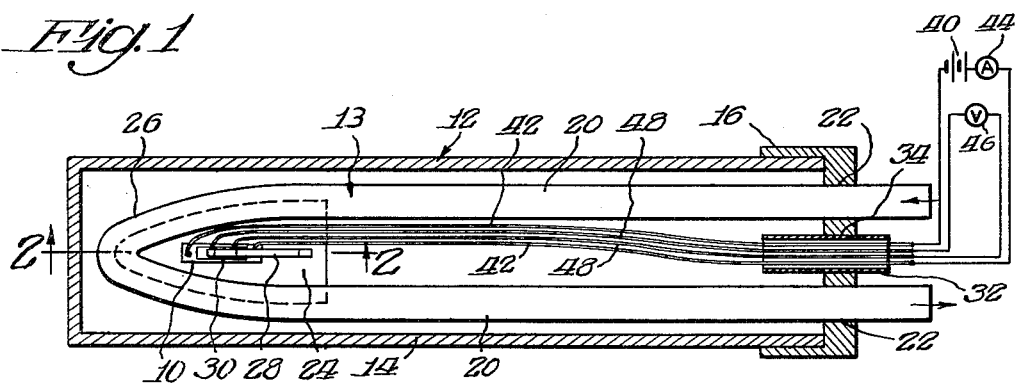
FIGURE 1 is a vertical cross-sectional view of the radiation monitor showing various features of the present invention.

A device in accordance with the present invention monitors total radiation by measuring the effect of radiation on an electrical property of a highly purified tellurium specimen. The tellurium specimen is maintained at a temperature below its electrical annealing temperature which is approximately 90° K.

More specifically, in the illustrated embodiment, the tellurium specimen is indicated by the reference numeral 10. The specimen 10 is cut from a single crystal of highly purified tellurium (i.e., an impurity content of less than approximately one part per million). The crystal may be grown in the conventional manner. Preferably, the specimen is made as pure as possible because the purer it is the more sensitive the specimen is to low amounts of radiation.

As far as has been determined, preferred results are provided by a specimen which is cut so that it has a longitudinal orientation, that is, the specimen is cut so that its larger dimension is parallel to the atom chains in the single crystal. However, the specimen may have other orientations, such as a perpendicular orientation (perpendicular to the atom chains), etc.

When high energy particles (radiation), such as neutrons or electrons, are delivered to the tellurium specimen 10, atoms therein are displaced from their normal crystal sites by the fast moving particles (that is, the particles break the bonds between atoms). Once displaced, the atom may have sufficient energy to displace other atoms in the specimen 10. The cross-section for atom-atom displacement collisions (the possibility of an atom displacing a second atom) is very large and, hence, a sufficiently energetic, displaced atom may displace a considerable number of other atoms within a small region. The number of atoms displaced depends upon the type of particles incident on the specimen 10 and the energy of particles.

When each atom is displaced from a crystal site it leaves behind a vacancy in the crystal structure and comes to rest as an interstitial atom. The net effect of these defects is to produce acceptor sites which induce holes in the valence band. The holes (p-type carriers) serve to carry current through the specimen 10 and normally the conductivity of the specimen would be increased by an increase in the number of holes. However, at room temperature the tellurium specimen is in its intrinsic range. In the intrinsic range, the densities of holes and electrons are equal, but any current through the specimen is carried mainly by the electrons since the electrons have a higher mobility than the holes. Hence, at room temperature added holes have little or no effect on the conductivity of the specimen 10. Moreover, at room temperature the radiation induced defects substantially anneal (go into thermodynamic equilibrium) in a relatively short time interval, and hence the defects effectively disappear or become complicated defects. Accordingly, it is difficult to separate the initial radiation induced defects from subsequent complications caused by annealing.

As the temperature of the specimen 10 is lowered to approximately 200° K., the specimen's conductivity decreases. This is due to recombination of the thermally generated free electrons and holes. As the temperature is lowered still further the carrier density is limited by defect concentration and the conductivity of the specimen increases because the mobility increases. Thus, the specimen becomes p-type and is in its extrinsic range, that is, the specimen's conductivity may be modified by the addition of acceptors. Thus, below approximately 200° K., the conductivity of the specimen 10 is increased by incident radiation.

While near a temperature of approximately 200° K., the radiation induced defects may change the conductivity, the defects anneal in a relatively short time interval. In order to eliminate the annealing effect, the specimen is maintained below the annealing temperature of tellurium. The annealing temperature of tellurium has been found to be approximately 90° K.

In the illustrated embodiment, the tellurium specimen 10 is maintained at a temperature of liquid nitrogen (approximately 78° K.). As shown in FIGURE 1 this is accomplished by disposing the specimen 10 in a container 12. Liquid nitrogen is passed through a U-shaped tube 13 disposed in the container 12 in order to provide a cooling means for the specimen 10.

The container 12 includes a tube 14 having one end closed. The other end of the tube 14 is open and is provided with a cover 16 which is connected to the tube 14 with an air tight seal. The U-tube 13 is disposed in the container 12 with its legs 20 extending through apertures 22 in the cover 16. The legs 20 are attached to the cover 16 with an air tight seal.

The container and U-tube are made of a material which permits the radiation being monitored to pass therethrough. A material such as aluminum or stainless steel may be employed when monitoring electron and neutron radiation.

In the illustrated embodiment a plate 24 for mounting the specimen 10 is attached to the U-tube 13 at its base 26. The tellurium specimen 10 is disposed on the mounting plate 24 and is held thereon by a suitable means, such as a spring clip 28 which is attached by one end to the mounting plate 24. The spring clip 28 is insulated from the specimen 10 by a suitable electrical insulator 30. The mounting plate 24 is anodized to provide electrical insulation between the specimen 10 and the mounting plate 24 while still providing a good thermal contact.

To prevent surface contamination of the specimen the container 12 is evacuated. The illustrated container 12 is evacuated by connecting a suitable vacuum pump to a tube 32 which extends through an aperture 34 in the cover 16, and is connected thereto with an airtight weld. After the container 12 is evacuated the end of the tube 32 is closed air-tight.

In the illustrated embodiment the conductivity of the specimen 10 is measured by the conventional four (4) probe method so as to prevent the resistance of leads employed in the measurement from entering into the measurement. In the 4 probe method, a measured current is passed through the specimen and a voltage measurement is obtained between spaced points along the current path. The conductivity of the specimen is proportional to the measured current divided by the measured voltage. It should be understood that the conductivity of the specimen 10 may also be measured by other methods. For example, on small specimens the conventional two (2) probe method may be more convenient.

Figure 2:
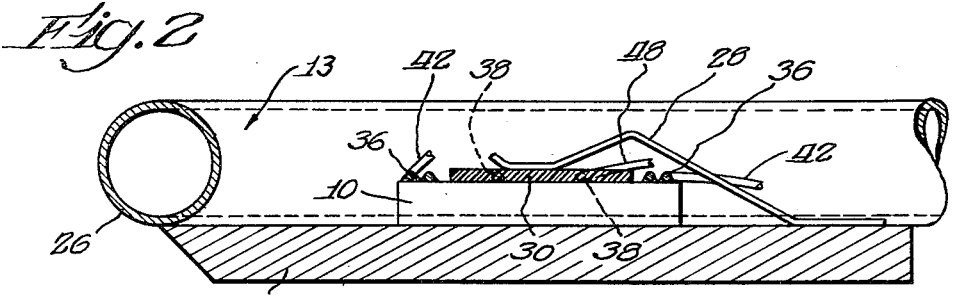
FIGURE 2 is an enlarged fragmentary cross-sectional view taken generally along line 2—2 of FIGURE 1.

As shown particularly in FIGURE 2, non-rectifying contacts 36 are made to the ends of the specimen 10 for use as current probes. Further non-rectifying contacts 38 are made to the specimen at spaced apart points intermediate the ends of the specimen for use as voltage probes. The current probes 36 may be attached to the specimen 10 by a relatively large contact area because a large area of contact does not affect the measurement. However, the voltage probes 38 are preferably attached with a small area of contact because, for example, a large contact area may adversely affect the properties of the specimen in the immediate vicinity of the contact and thus affect the voltage reading.

The current probe contacts 36 may be of a wire composed of a material which does not form a rectifying contact with tellurium, such as a platinum and rhodium alloy, etc. The wire is bonded to the specimen 10 by, for example, passing a sufficient current through the wire to melt it into the specimen.

The voltage probe contact 38 may be a wire of similar material to the current probes 36. The wire is suitably bonded to the tellurium specimen by, for example, spot welding.

Current is delivered to the current probes 36 by a D.-C. power source 40 which is coupled to the current probes 36 through insulated conductors 42. The insulated conductors extend into the container 12 through the tube 32. An ammeter 44 is connected in series with the power source 40 and the specimen 10 to measure the current being passed through the specimen 10.

A voltmeter 46 is coupled to the voltage probes 38 by means of insulated conductors 48 which extend into the container 12 through the tube 32.

By knowing the distance between the voltage probes 38, the cross sectional area of the specimen, and by measuring the current being passed through the specimen 10 and the voltage developed across the voltage probes 38, the conductivity of the specimen 10 may be determined.

It has been found that up to a relatively large amount of total radiation, the effect of additional radiation on the tellurium specimen 10 is substantially proportional, that is, the same amount of radiation causes an equal change in conductivity whether it is received when the specimen has or has not been exposed to radiation. Thus, each additional amount of radiation adds a substantially proportional amount of conductivity to the conductivity caused by the previously received radiation. It has also been found that the relative change in conductivity is independent of specimen size. However, the specimen 10 is preferably made small enough so that all the radiation being measured has sufficient energy to pass therethrough. Otherwise, the change in conductivity may not be proportional to the incident radiation.

The specimen maintains its radiation induced conductivity if it is maintained at a temperature below its annealing temperature. In order to erase the radiation induced conductivity, the specimen 10 is maintained at a temperature above its annealing temperature. As previously indicated, tellurium anneals at approximately 90° K. However, at 90° K., tellurium anneals at a relatively slow rate. Tellurium may be completely annealed in several hours by maintaining it at room temperature, or in 10 minutes by maintaining it at approximately 353° K. (80° C.). The device may be reused for monitoring radiation by recooling the specimen to a temperature below its annealing temperature.

It has been found that the rate of change of conductivity is substantially the same for each re-run with appropriate anneals between them. The radiation monitor may be calibrated by any suitable means which is sensitive to total radiation of the type being measured. For example, in the case of electron radiation, the radiation monitor may be calibrated with a Faraday cup.

In one embodiment of the invention a specimen two millimeters thick is cut from a highly purified (i.e. impurity content of less than approximately one part per million) single grown crystal of tellurium so that it has a parallel orientation. The tellurium specimen is approximately 1 cm. long, approximately 3 mm. wide, and approximately 2 mm. thick. The initial conductivity of the tellurium specimen is approximately 0.04 (ohm-cm.)$^{-1}$ at approximately 78° K. The specimen is mounted on an anodized aluminum mounting plate at the base of a one-quarter of an inch U-tube through which liquid nitrogen is passed. A 5 mil U-shaped wire of 90% platinum and 10% rhodium is melted into each end of the tellurium specimen by passing a current through the wire. A 1 mil platinum wire is spot-welded to the tellurium specimen at two points intermediate the ends thereof. The U-shaped wires and the 1 mil wire are, in turn, soldered to insulated conductors. The U-shaped tube is disposed in an air-tight aluminum container which is evacuated to a vacuum of approximately $10^{-4}$ mm. of Hg.

Figure 3:
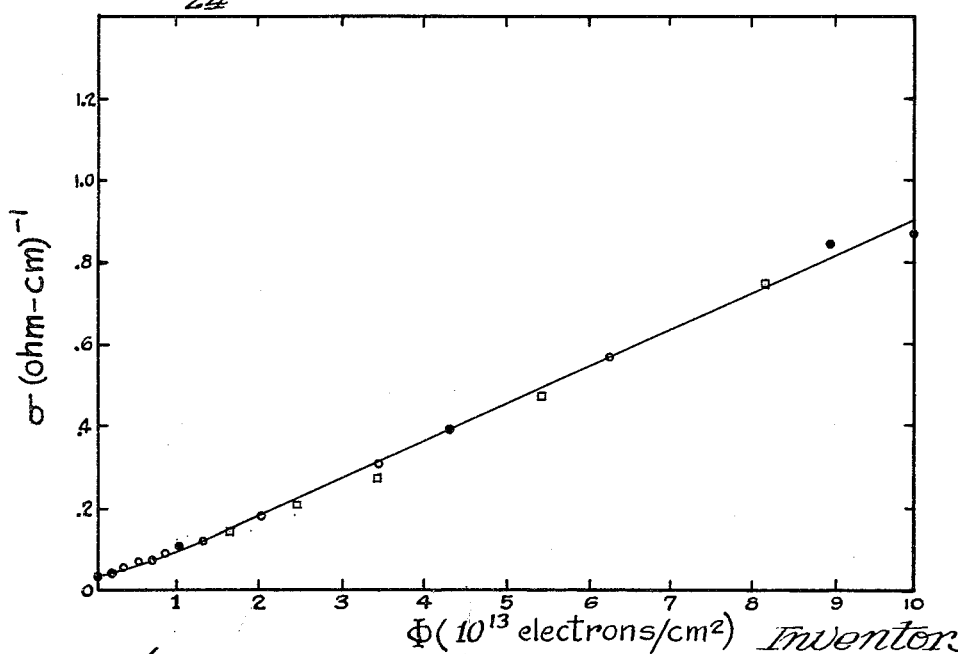
FIGURE 3 is a graph showing the relationship between the radiation delivered to the device shown in FIGURE 1 and the conductivity of the device at 78° K. for 25 mev. electrons.

FIGURE 3 shows the change in conductivity produced in the tellurium specimen by electron radiation. The initial rate of change of conductivity with electron radiation (25 mev. electrons) is approximately $1 \times 10^{-14}$ (ohm-cm.)$^{-1}$ per electron/cm.$^2$. This rate of change is maintained up to approximately $3 \times 10^{14}$ electron/cm.$^2$. A further increase in electron radiation produces reproducible changes in conductivity but at a lesser rate.

The radiation monitor is annealed by maintaining it overnight at room temperature or for 10 minutes at 80° C., and the radiation monitor returns to its initial conductivity. Upon being exposed to radiation, the change in conductivity for radiation follows the same curve. Neutron irradiation produces a similar effect in the tellurium specimen.

As can be seen from the above, a radiation monitor is provided which is not permanently damaged by radiation and hence may be continually re-used to monitor total radiation. The radiation monitor measures total radiation over a considerable range. The amount of radiation which has impinged on the radiation monitor may be simply and easily determined without elaborate circuitry.

It should be understood that instead of calculating the conductivity or resistance by employing the measured voltage between a pair of probes a known distance apart for a known current, any other electrical property of a tellurium specimen, which is a function of conductivity, may be measured to indicate the total radiation incident on the specimen. For example, it may be more convenient to measure the resistance of the specimen, the current which flows through the specimen for a constant applied voltage, etc.

Various changes and modifications may be made in the above described radiation monitor without departing from the spirit or scope of the present invention. Various features of the invention are set forth in the accompanying claims.

What is claimed is:

1. A monitor for measuring total radiation, comprising a highly purified tellurium specimen, means for maintaining said specimen at a temperature below approximately 90° K., and means associated with said specimen for measuring an electrical property thereof which is changed by radiation.

2. A monitor for measuring total radiation, comprising a specimen consisting essentially of highly purified tellurium, means for maintaining said tellurium at a temperature of approximately 78° K., and means coupled to said specimen for measuring an electrical property thereof which is changed by radiation.

3. A monitor for measuring total radiation, comprising an evacuated air tight container, a specimen cut from a single crystal consisting essentially of highly purified tellurium disposed in said container, said specimen being of such a size that the radiation being measured passes therethrough, means for maintaining said specimen at a temperature of liquid nitrogen, and means coupled to said specimen for measuring an electrical property thereof which is changed by radiation.

4. A monitor for measuring total radiation, comprising an evacuated air tight container, a U-tube extending into said chamber, a specimen cut from a single crystal consisting essentially of substantially pure tellurium, said specimen being small enough that the radiation has sufficient energy to pass therethrough, means for mounting said specimen within said container in thermal relationship with said tube, said tube being adapted to receive liquid nitrogen therethrough, and means coupled to said specimen for measuring its conductivity.

References Cited in the file of this patent

UNITED STATES PATENTS

| | | |
|---|---|---|
| 2,034,334 | Falkenthal | Mar. 17, 1936 |
| 2,189,122 | Andrews | Feb. 6, 1940 |
| 2,564,626 | MacMahon et al. | Aug. 14, 1951 |
| 2,671,154 | Burnstein | Mar. 2, 1954 |
| 2,678,400 | McKay | May 11, 1954 |
| 2,760,078 | Youmans | Aug. 21, 1956 |
| 2,844,737 | Hahn et al. | July 22, 1958 |
| 2,953,690 | Lawson et al. | Sept. 20, 1960 |
| 2,986,644 | Cheroff | May 30, 1961 |
| 2,988,639 | Welker et al. | June 13, 1961 |
| 3,012,143 | Cheek et al. | Dec. 5, 1961 |
| 3,029,353 | Gold et al. | Apr. 10, 1962 |